No. 895,933. PATENTED AUG. 11, 1908.
E. F. W. ALEXANDERSON & E. H. WIDEGREN.
SELF EXCITING GENERATOR.
APPLICATION FILED NOV. 21, 1907.

WITNESSES:
Lester H. Fulmer.
J. Ellis Glen.

INVENTORS
ERNST F. W. ALEXANDERSON.
EMIL H. WIDEGREN.
BY Albert G. Davis
ATTY.

UNITED STATES PATENT OFFICE.

ERNST F. W. ALEXANDERSON AND EMIL H. WIDEGREN, OF SCHENECTADY, NEW YORK, ASSIGNORS TO GENERAL ELECTRIC COMPANY, A CORPORATION OF NEW YORK.

SELF-EXCITING GENERATOR.

No. 895,933.     Specification of Letters Patent.     Patented Aug. 11, 1908.

Application filed November 21, 1907. Serial No. 403,122.

*To all whom it may concern:*

Be it known that we, ERNST F. W. ALEXANDERSON and EMIL H. WIDEGREN, citizens of the United States, residing at Schenectady, county of Schenectady, State of New York, have invented certain new and useful Improvements in Self-Exciting Generators, of which the following is a specification.

Our invention relates to self-exciting, self-compounding, alternating-current generators or synchronous motors of the type described in Patent No. 789,476, issued to E. F. W. Alexanderson, May 9, 1905, and its object is so to arrange the exciting circuits as to compensate for unequal compounding of the different phases of the exciting voltages.

The generator disclosed in the patent above mentioned comprises a field-magnet provided with a rectifying commutator and a polyphase arrangement of brushes, with means for supplying polyphase shunt voltages to said brushes to excite the field, and means for compounding the exciting voltages for variation of load on the generator. In order that the rectifying commutator may operate sparklessly, it is essential that the voltages supplied to the brushes be approximately balanced. In the case of a polyphase generator operating on balanced load, the exciting voltages and equal compounding of the several phases of the exciting voltages is obtained, but if the generator is operating on a single-phase load or on an unbalanced polyphase load, the compounding of the several phases is unequal.

By our invention an approximately balanced voltage at the commutator brushes is obtained with unequal compounding of the several phases.

Our invention consists in adjusting the exciting circuits to produce this balanced voltage with unequal compounding.

Figure 1:
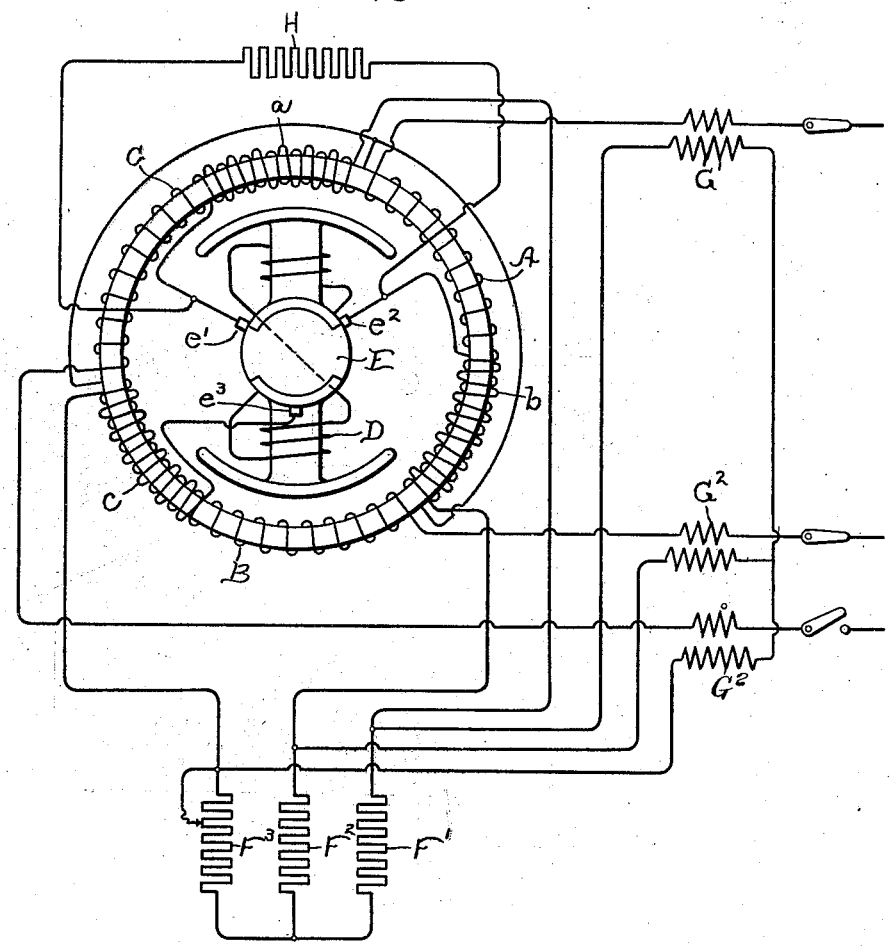
Figure 3:
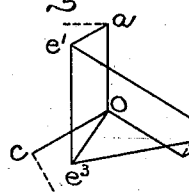
Figure 2:
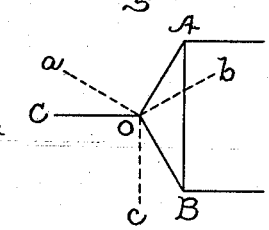
Figure 4:
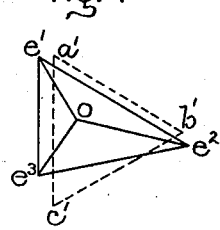

Our invention will best be understood by reference to the accompanying drawings, in which Figure 1 shows diagrammatically a self-exciting alternating-current generator arranged in accordance with our invention, and Figs. 2, 3 and 4 are explanatory diagrams.

In Fig. 1, A, B and C represent the three phases of the main armature winding, which is shown star-connected. D represents the field winding, which is provided with the rectifying commutator E and a three-phase arrangement of commutator brushes $e^1$, $e^2$ and $e^3$. The commutator segments are arranged, as described in the patent above mentioned, to engage one brush at the instant of leaving another brush, so that the field-circuit is never opened, but is transferred from one phase of the exciting circuit to another. A shunt excitation may be obtained from shunt transformers, as shown in the patent above mentioned, but in the drawing we have illustrated for this purpose an auxiliary winding on the armature comprising three phases, $a$, $b$ and $c$. Since, in accordance with the principle set forth in the above-mentioned patent, the shunt and series excitation for each phase should be displaced 90 electrical degrees in phase on non-inductive load, in order to obtain proper compounding for varying power-factor, the auxiliary winding $a$ is displaced 90 electrical degrees on the armature from the main winding A, and auxiliary windings $b$ and $c$ are similarly displaced from the main windings B and C.

One terminal of each of the auxiliary windings is connected directly to a commutator brush, while the other terminals are connected together through resistances $F^1$, $F^2$ and $F^3$, so that the three auxiliary windings are connected in star. For compounding the generator for varying loads, series transformers $G^1$, $G^2$ and $G^3$ are arranged with their secondaries connected in shunt to the resistances $F^1$, $F^2$ and $F^3$. The operation of these series transformers in compounding the generator is fully disclosed in the patent above mentioned, and need not be explained in detail here.

If there is a balanced three-phase load on the generator, the currents in the three series transformers are equal, and equal compounding of the several phases of the exciting circuits is secured. If, however, the load is unequal on the three phases of the generator, the compounding of the exciting circuits is no longer equal. The extreme case is illustrated in Fig. 1, in which one line-conductor,—that connected to the terminal of phase C—is open-circuited, so that the generator is supplying a single-phase load. The exciting circuits are shown adjusted to produce approximately balanced voltages at the commutator brushes with this load-condition. The manner in which this adjustment is obtained will best be understood by reference to Figs. 2, 3 and 4. In Fig. 2, OA, OB and OC represent the phases of the voltages induced in the main armature winding, and O$a$, O$b$ and O$c$ represent the phases of the voltages induced in the auxiliary exciting windings. If the load on the generator is non-inductive, the phase of the current in the armature winding of the generator will be represented by AB. It will be seen that this is in phase with the voltage O$c$ induced in the phase $c$ of the auxiliary winding, and consequently produces a cross-magnetizing effect with respect to the voltage induced in winding $c$, which tends to displace the phase of this voltage. Furthermore, the armature-current AB, instead of being 90 degrees out of phase with the voltages O$a$ and O$b$ is only 60 degrees out of phase with each of them.

The result, as far as compounding is concerned, is shown in Fig. 3. In this figure again, O$a$ represents the voltage induced in the auxiliary winding $a$. If the generator were operating under balanced load, the series excitation on non-inductive load would be at right-angles to O$a$, as indicated by the dotted line, and as described in the patent above mentioned. But since the current in the generator is not 90 degrees out of phase with O$a$ on non-inductive load, but is only 60 degrees out of phase with this voltage, the series excitation is represented by the line $a$ $e^1$. Similarly, the compounding effect on the shunt voltage O$b$ is represented by the line $b$ $e^2$, parallel to $a$ $e^1$. For the shunt voltage O$c$ there is no series excitation, since that phase of the main armature winding is open. The effect of the armature current on the generator is simply to shift the phase of this voltage, as has been already explained, and there is nothing to compensate for the voltage-drop in the resistance $F^3$ in series with this phase of the shunt excitation. Consequently, if the resistances $F^1$, $F^2$ and $F^3$ were all equal, as in the former patent, the effective voltage of this phase would be represented by the line O$e^3$ out of phase with O$c$, and reduced in amount. Consequently, the voltages impressed on the brushes $e^1$, $e^2$ and $e^3$ would be represented by the lines O$e^1$, O$e^2$ and O$e^3$ of Fig. 4, and instead of a balanced three-phase voltage at the brushes, the distorted triangle of voltages, $e^1$, $e^2$ and $e^3$, would be produced. It is evident from this triangle that in order to produce balanced voltages at the brushes, the line O$e^3$ must be increased, and the line $e^1$ $e^2$ must be decreased. To secure the first result, a portion of resistance $F^3$ is short-circuited, as shown in Fig. 1. By cutting out a portion of this resistance, the same effect is obtained as by shunting the resistance by a series transformer carrying current of a certain amount. Furthermore, a resistance H is connected across the brushes $e^1$ and $e^2$. This puts an extra load on that phase of the exciting circuit, and consequently a greater voltage-drop is produced in resistances $F^1$ and $F^2$. By means of these two adjustments the voltage across brushes $e^1$ and $e^2$ is decreased, and the voltage corresponding to the line O$e^3$ in Fig. 4 is increased so that voltages are obtained at the commutator brushes corresponding approximately to the equilateral triangle $a^1$, $b^1$ and $c^1$, shown in dotted lines in Fig. 4.

We do not desire to limit ourselves to the particular adjustments employed, since equivalent arrangements will readily present themselves to those skilled in the art.

What we claim as new, and desire to secure by Letters Patent of the United States, is,—

1. In an alternating-current generator, a field winding provided with a rectifying commutator and a polyphase arrangement of brushes bearing thereon, means for supplying polyphase shunt voltages to said brushes to excite the field, means for compounding said voltages for variation of load on the generator, and means for adjusting the exciting circuits to compensate for unequal compounding of the different phases of said exciting voltages.

2. In an alternating-current generator, a field winding provided with a rectifying commutator and a polyphase arrangement of brushes bearing thereon, means for supplying polyphase shunt voltages to said brushes to excite the field, means for compounding said voltages for variation of load on the generator, the exciting circuits being adjusted for substantially balanced voltages at said brushes under load with unequal compounding of the different phases of said voltages.

3. In an alternating-current generator, a field winding provided with a rectifying commutator and a polyphase arrangement of brushes bearing thereon, a source of polyphase shunt voltages connected to said brushes, resistances in series with said source, and series transformers having their primaries in series with the armature of the generator and their secondaries in shunt to said resistances, said resistances being adjusted to compensate for unequal currents in the transformers.

4. In an alternating-current generator, a field winding provided with a rectifying commutator and a polyphase arrangement of brushes bearing thereon, means for supplying polyphase shunt voltages to said brushes to excite the field, means for compounding said voltages for variation of load on the generator, and a resistance connected across a pair of said brushes to compensate for unequal compounding of the different phases of said exciting voltages.

5. In an alternating-current generator, a field winding provided with a rectifying commutator and a polyphase arrangement of brushes bearing thereon, means for supplying polyphase shunt voltages to said brushes to excite the field, means for compounding said voltages for variation of load on the generator, the resistances of the several exciting circuits differing in amount to compensate for unequal compounding of the several phases of said exciting voltages.

In witness whereof, ERNST F. W. ALEXANDERSON has hereunto set his hand this 9th day of November, 1907, and EMIL H. WIDEGREN has hereunto set his hand this 15th day of November, 1907.

ERNST F. W. ALEXANDERSON.
    EMIL H. WIDEGREN.

Witnesses to Alexanderson:
 BENJAMIN B. HULL,
 HELEN ORFORD.
Witnesses to Widegren:
 THEO. W. NIEDRINGHAUS.
 JNO. C. RUTT.